April 5, 1949.                    R. T. JAGENBURG                    2,466,314
                         CUTTING TOOL FOR CORING PINEAPPLES
                                Filed June 20, 1947
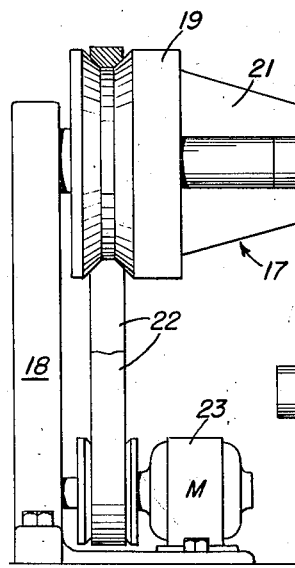
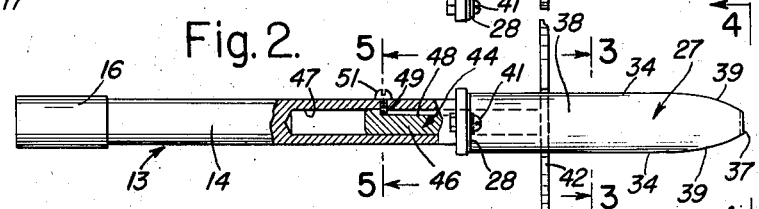
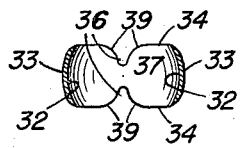
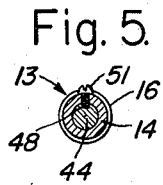
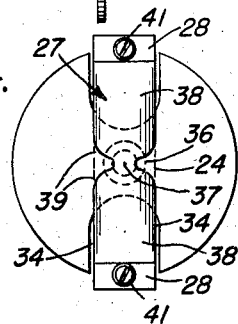
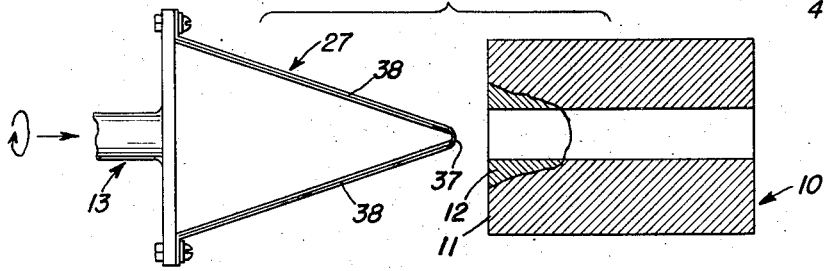
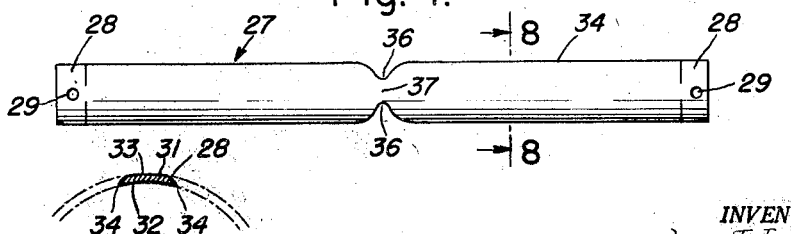
INVENTOR.
Rene T. Jagenburg
BY Patented Apr. 5, 1949

2,466,314

UNITED STATES PATENT OFFICE 2,466,314

CUTTING TOOL FOR CORING PINEAPPLES

Rene T. Jagenburg, Brooklyn, N. Y., assignor to
E. R. Jagenburg, Inc., Brooklyn, N. Y.

Application June 20, 1947, Serial No. 755,964

2 Claims. (Cl. 146—6)

1

The invention relates to fruit trimming and relates more particularly to cutting tools for trimming fruits, particularly cored pineapples.

In preparing pineapples for consumption and particularly for canning, the skin of the fruit has to be removed as well as the core thereof. The core usually grows within a pineapple more or less cylindrical along the central axis of the fruit, but near one end is usually characterized by an irregular rubbery core growth.

The cylindrical part of the core is customarily removed by boring centrally through the fruit. Afterwards, the fringe of rubbery core growth has to be removed in a separate operation.

This core growth removal has, in the past, always been associated with trouble, and many contrivances have been tried, until finally the problem was solved by cutting off an entire slice of the fruit. That not only represents considerable waste of edible parts of the fruit, but even this drastic method did not always succeed in removing all of the core, since the rubbery core growth is sometimes so irregular that too large a portion of the fruit would have to be discarded.

It is therefore one of the principal objects of the invention to remove the irregularly grown portions of a pineapple core with a minimum of waste.

Another object of the invention is the provision of a cutting tool that will remove only the irregularly grown core portions and leave the remainder of the fruit intact.

Another object of the invention is to provide such a cutting tool that will remove a conical part from a fruit, the cone tapered for about thirty degrees.

A further object of the invention is the provision of such a cutting tool that is light in weight and easy to handle.

A still further object of the invention is to provide such a cutting tool together with guiding means for limiting the cutting to a desired depth.

Further objects and advantages of the invention will be set forth in part in the following specification and in part will be obvious therefrom without being specifically referred to, the same being realized and attained as pointed out in the claims hereof.

With the above and other objects of the invention in view, the invention consists in the novel methods, construction, arrangement and combination of various devices, elements and parts, as set forth in the claims hereof, one embodiment of the same being illustrated in the accompanying drawings and described in the specification.

In the accompanying drawings,

Fig. 1 is an elevational view of a cutting tool in accordance with the invention, held in a revolving fixture;

2

Fig. 2 is a side elevational view, partly in section, of the cutting tool shown in Fig. 1;

Fig. 3 is a sectional view taken along line 3—3 of Fig. 2;

Fig. 4 is an end elevational view as seen in direction of an arrow 4 of Fig. 2;

Fig. 5 is a sectional view taken along line 5—5 of Fig. 2;

Fig. 6 is an extended view, partly in section, of a partially trimmed pineapple and a cutting tool;

Fig. 7 is an elevational view of a blank for a cutting tool blade; and

Fig. 8 is a sectional view taken along line 8—8 of Fig. 7.

In carrying the invention into effect in one of the embodiments which has been selected for illustration in the accompanying drawings and for description in this specification, and referring now particularly to Fig. 6, a conventionally trimmed and cored pineapple 10 is shown that has at the stem end 11 an irregular, rubbery core growth 12. This irregular growth is not always symmetrical with respect to the cylindrical part of the core as has been shown in Fig. 6, but may be more predominant or even entirely at one side thereof.

The present invention provides a cutting tool for removal of such irregular remaining core portions, generally indicated at 13, that comprises a shaft 14 having at one end an enlarged portion 16. Since the cutting tool 13 is preferably employed while rotating about the longitudinal axis of the shaft 14, the enlarged portion 16 is used in connection with a revolving fixture 17.

The revolving fixture 17, as shown in Fig. 1, has a support 18 and a revolving chuck 19 with adjustable clamps 21 that engage the enlarged portion 16 of the shaft 14. The chuck is rotated by a belt drive 22 that is powered by an electric motor 23. The preferred speed of rotation for the cutting tool is about sixty revolutions per minute (60 R. P. M.).

A mounting plate or platform 24 is secured to the other end 26 of said shaft 14 and is preferably integral therewith. Said platform 24 is of narrow rectangular shape and is perpendicular to the longitudinal extension of the shaft 14.

A cutting element or blade, generally designated 27, is mounted to said platform 24 opposite with relation to said shaft 14. As best shown in Fig. 7, the cutting blade is made from a blank that is of longitudinal form. At the longitudinal ends the blank is provided with flat portions 28 that are rectangular in shape, and one flat portion 28 is connected at each end of the blank, and each flat portion has a central hole 29. The remaining portion 31 of said blank which is the major portion thereof, is curved cylindrically, as best shown in Fig. 8. Said major portion has on one side a concave surface 32 and opposite thereto a convex surface 33, and near the lateral sides of the blank the convex surface 33 is ground to join the concave surface 32, to provide two cutting edges 34 confining the blank laterally.

Two aligned and oppositely disposed recesses 36 are located about midway in said blank and each recess extends from a cutting edge 34 towards the interior of the blank. Thus, the blank is provided with a converging portion 37 to facilitate bending of the blank at that convergence.

In fabricating the tool, the blank is bent at the converging portion 37 downwardly with respect to Fig. 8, or, towards the center of the cylinder defining the curvature of the major portion 31. By this bending, the blade is formed V-shaped dividing the length into two legs 38 at each side of the convergence 37, said legs being disposed at an angle of about thirty degrees (30°) to one another. The legs 38 face each other with the concave surfaces 32, and the convex surfaces 33 are facing outwardly with respect to the V-shaped design.

The flat portions 28 are bent oppositely relative to the bending of said legs 38 so that they face outwardly of the V-shaped design and are interaligned. Preferably, the thus formed blade 27 is subjected to grinding of the cutting edges 34 near the converging portion 37 to provide tapering at 39.

The cutting blade 27 is secured with the flat portions 28 to said platform 24, by means of screws 41 that protrude through the opening 29 of the flat portions 28. In this manner the converging portion 37 which provides the juncture of the integral legs 38, is spaced furthermost from the platform 24 and each leg 38 is fastened with its free end relative to the platform 24. Thereby the cutting element and the platform are forming a hollow endless even-sided triangle, for providing a cutting tool in accordance with the invention.

The cutting tool is applied to a cored pineapple, as shown in Fig. 6. However, where the growth of the core end on the side 12 of the pineapple is non-symmetrical, the pineapple will be held at a different angle to the cutting tool than that shown in Fig. 6. The fruit is applied against the rotating cutting tool manually or it may be held in a special holder (not shown) for that purpose.

In order to guide the cutting, and to prevent too deep a cut, a movable guide is provided, indicated generally at 42. The guide 42 is movable between two extreme positions, a normal position in which it is held by spring pressure (see Fig. 1), and a second position of abutment with the platform 24. The guide comprises a guiding plate 43 that is parallel with the platform 24 and of substantially circular shape having two opposite recesses in the periphery and a rod 44 that is connected to the center of said guide plate and extends with one end portion 46 into a bore 47 that is provided in the shaft 14. Said bore 47 extends to the end 26 of said shaft and through said platform 24 and receives the end portion 46 of the rod 44 in sliding engagement. Said end portion 46 of the rod 44 has a groove 48 that reaches to a point near the longitudinal end of said rod 44.

Said shaft 14 has a threaded hole 49, and a screw 51 is disposed in said hole 49 and extends with its end into said groove 48. Thereby, said guide plate 43 is prevented from turning and from transgressing beyond its normal position. A spring 52 surrounds a portion of the rod 44 between said guiding plate 43 and said platform 24 and maintains the former resiliently in its normal position spaced from the platform 24. In this normal position, the side edges 53 of the guide plate 43 are disposed near the cutting edges 34 about midway of the legs 38. The guide plate 43 extends at both sides laterally of the cutting edges 34.

When the fruit is applied against the revolving cutting tool, the latter will cut its way thereinto, removing conical portions therefrom, until the side 11 of the fruit reaches the guiding plate 43. This is an indication for the operator to stop the operation and inspect the fruit. Should further cutting be required, the fruit is pressed farther against the cutting tool thereby exerting pressure against the guiding plate 43. This pressure overcomes the relatively weak strength of the spring 52 and moves the guiding plate 43 towards the platform 24. As this movement proceeds, the cutting extends deeper into the fruit, and, since the strength of the spring 52 increases with its compression, the operator is constantly being warned to avoid too deep cutting.

It will be apparent to those skilled in the art that the novel principles of the invention disclosed herein in connection with specific exemplifications thereof will suggest various other modifications and applications of the same.

It is accordingly desired that in construing the breadth of the appended claims they shall not be limited to the specific exemplifications of the invention described herein.

Having thus described the invention, what I claim as new and desire to be secured by Letters Patent, is as follows:

1. A pineapple corer comprising a shaft, a shaft support, means to rotate said shaft, a platform at the one end of said shaft, a V-shaped cutter mounted on said platform and provided with two substantially straight legs having an arcuated cross section, a center rod slideably located in the end portion of said shaft, a spring surrounding said center rod and attached with its one end to said platform and a guide-disc fastened to the other end of said spring in substantially parallel relationship to said platform and extending on both sides of said cutter.

2. A pineapple corer comprising a shaft, a shaft support, means to rotate said shaft, a platform at the one end of said shaft, a V-shaped one-piece cutter mounted on said platform and provided with two substantially straight legs having an arcuated cross section, a center rod slideably located in the end portion of said shaft, a spring surrounding said center rod and attached with its one end to said platform and a guide-disc fastened to the other end of said spring in substantially parallel relationship to said platform and extending on both sides of said cutter.

RENE T. JAGENBURG.

REFERENCES CITED

The following references are of record in the file of this patent:

UNITED STATES PATENTS

| Number | Name | Date |
|---|---|---|
| 857,512 | Baker | June 18, 1907 |
| 1,008,555 | Mower | Nov. 14, 1911 |
| 1,066,174 | Barghausen | July 1, 1913 |
| 1,448,532 | Harding | Mar. 13, 1923 |
| 1,500,085 | Leavitt | July 1, 1924 |
| 1,566,463 | Bem | Dec. 22, 1925 |
| 1,631,854 | Carroll | June 7, 1927 |